No. 700,217. Patented May 20, 1902.
J. F. MEIGS & S. A. S. HAMMAR.
BREECH LOADING GUN.
(Application filed Nov. 7, 1898.)
(No Model.) 10 Sheets—Sheet I.
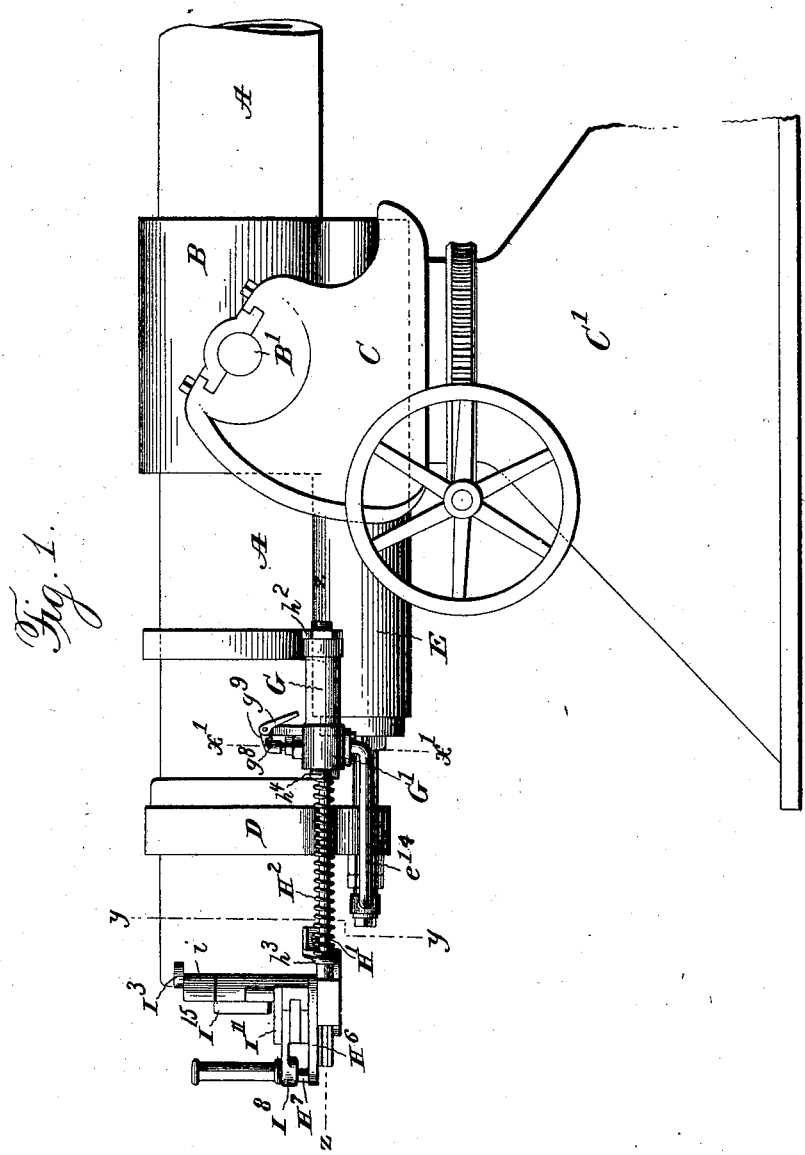

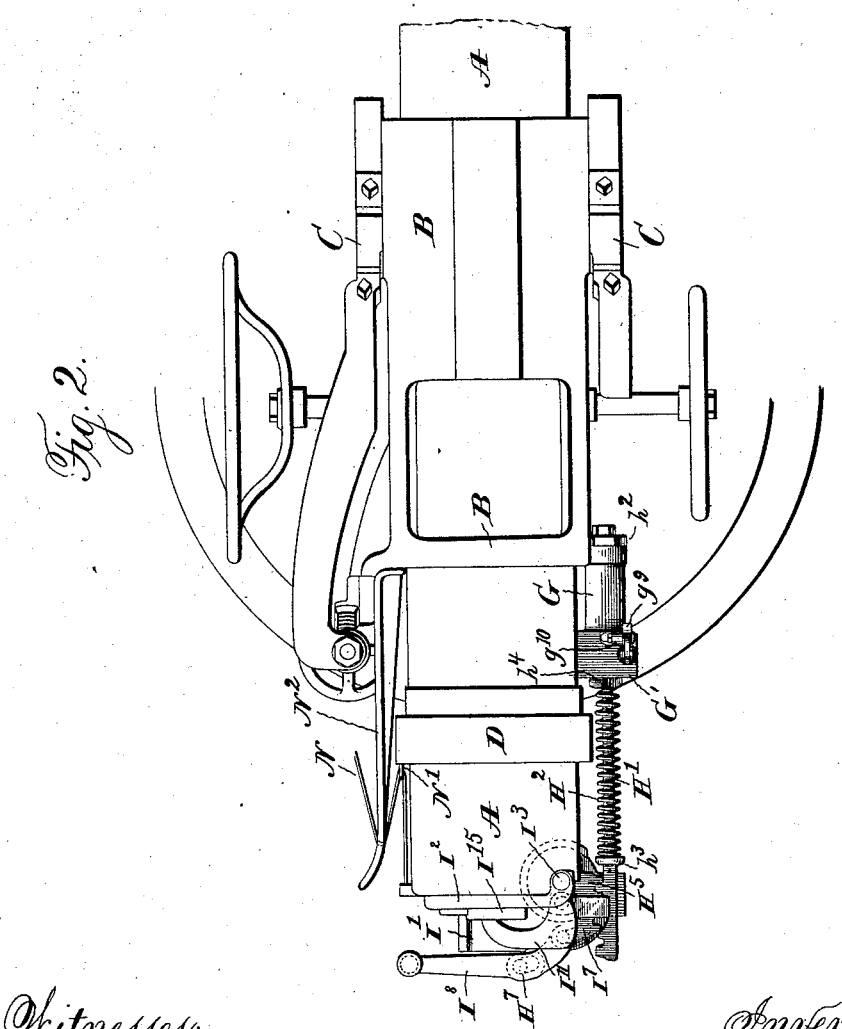

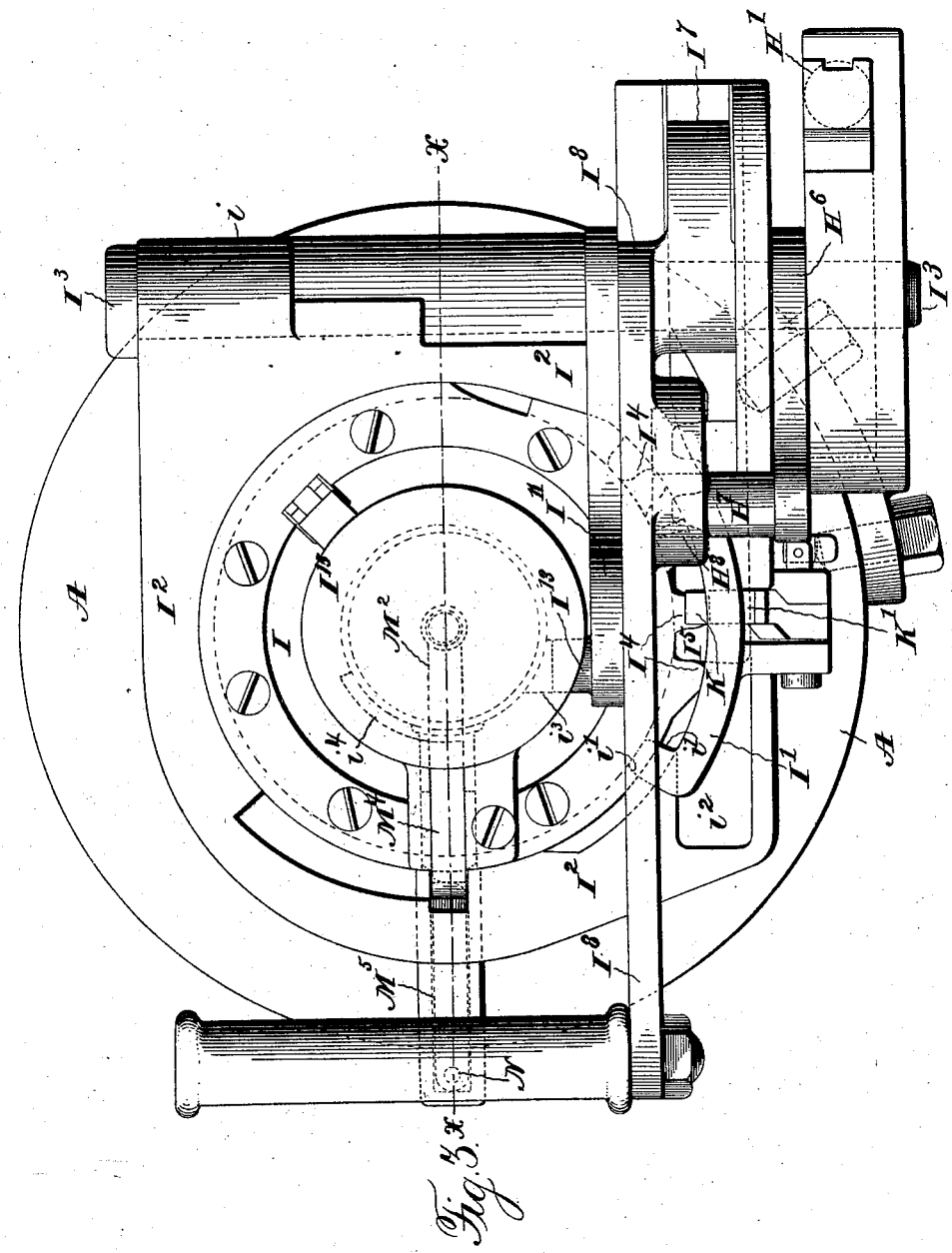

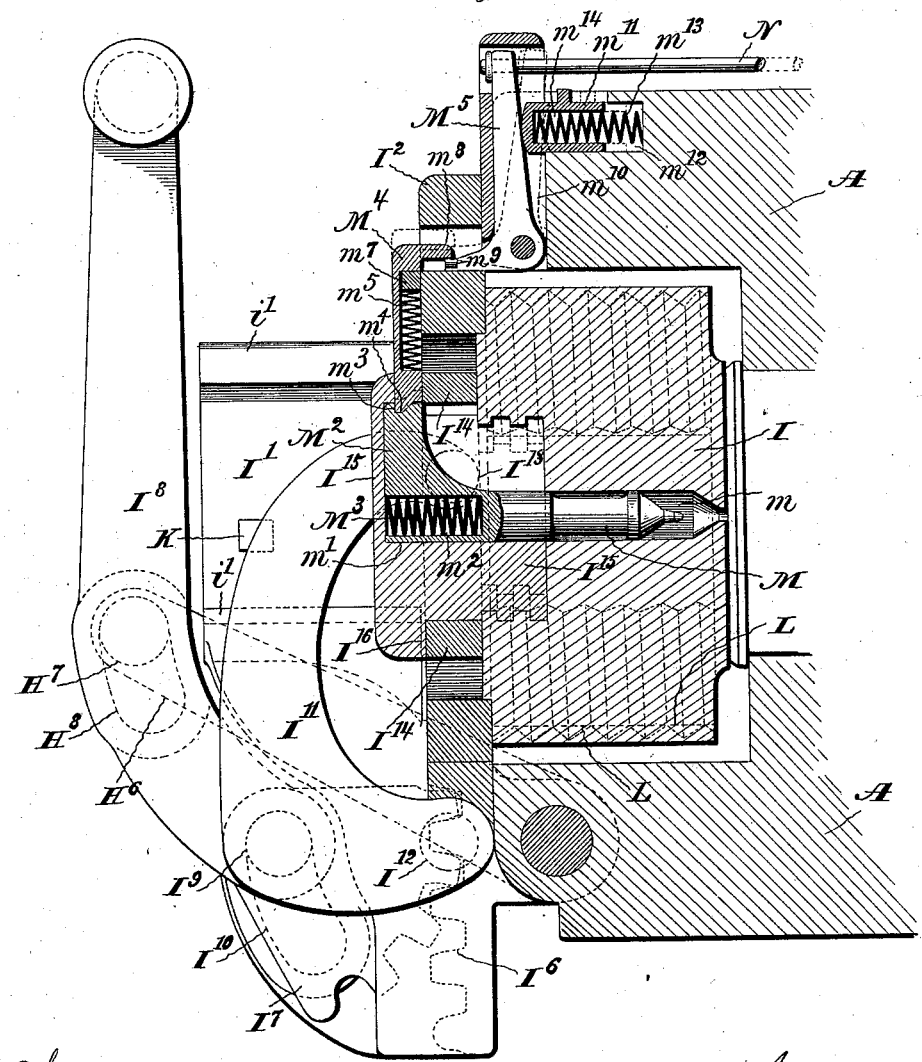

No. 700,217. Patented May 20, 1902.
J. F. MEIGS & S. A. S. HAMMAR.
BREECH LOADING GUN.
(Application filed Nov. 7, 1898.)
(No Model.) 10 Sheets—Sheet 5.
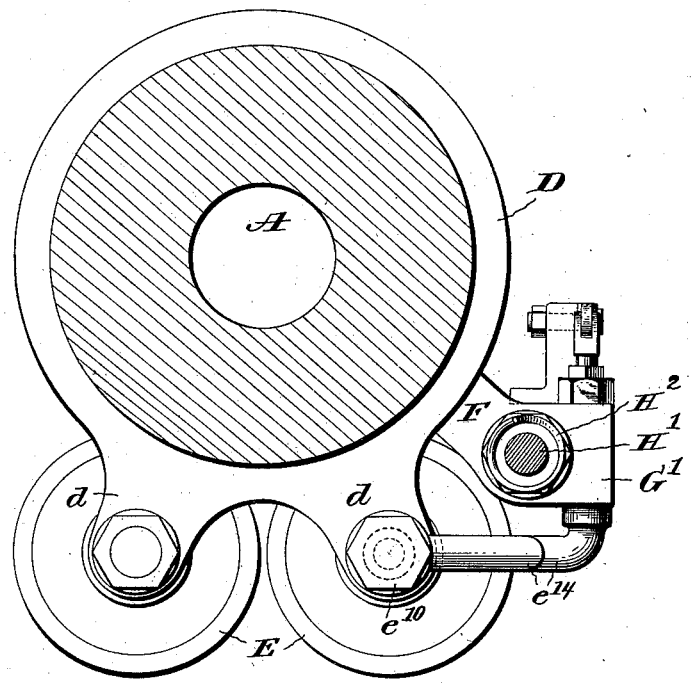
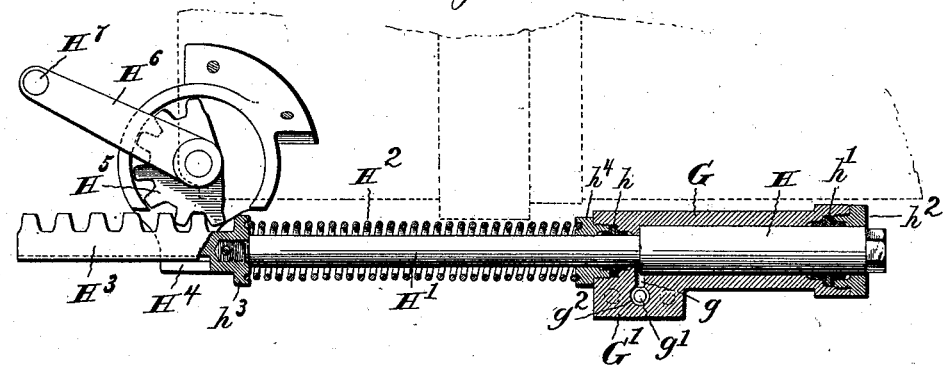

No. 700,217. Patented May 20, 1902.
J. F. MEIGS & S. A. S. HAMMAR.
BREECH LOADING GUN.
(Application filed Nov. 7, 1898.)

(No Model.) 10 Sheets—Sheet 6.

Witnesses:
Jas. E. Hutchinson.
Henry C. Hazard.

Inventors.
John F. Meigs and
Sigard A. Sten Hammar
by Pringle and Russell
their Attorneys No. 700,217. Patented May 20, 1902.
J. F. MEIGS & S. A. S. HAMMAR.
BREECH LOADING GUN.
(Application filed Nov. 7, 1898.)

(No Model.) 10 Sheets—Sheet 7.

No. 700,217. Patented May 20, 1902.
J. F. MEIGS & S. A. S. HAMMAR.
BREECH LOADING GUN.
(Application filed Nov. 7, 1898.)
(No Model.) 10 Sheets—Sheet 8.
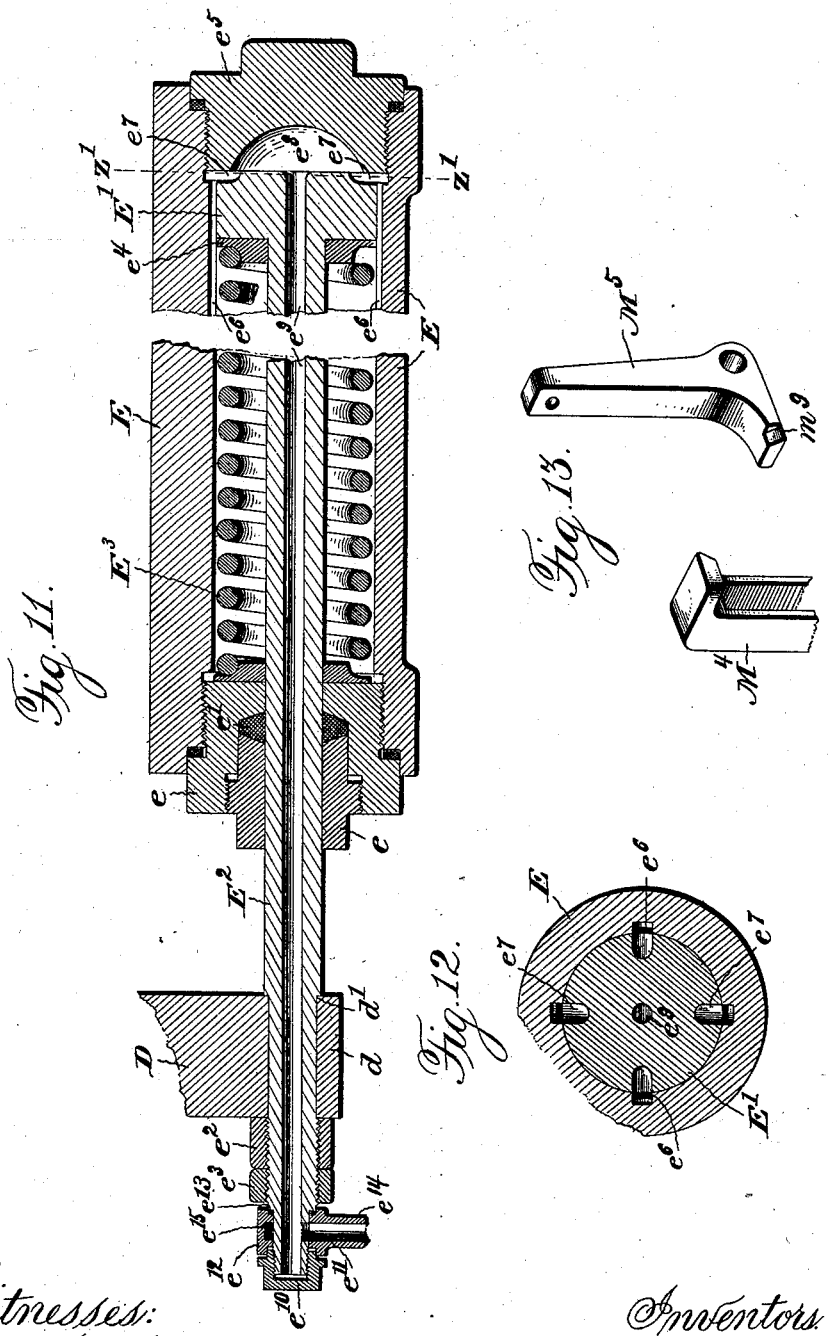

No. 700,217. Patented May 20, 1902.
J. F. MEIGS & S. A. S. HAMMAR.
BREECH LOADING GUN.
(Application filed Nov. 7, 1898.)
(No Model.) 10 Sheets—Sheet 9.
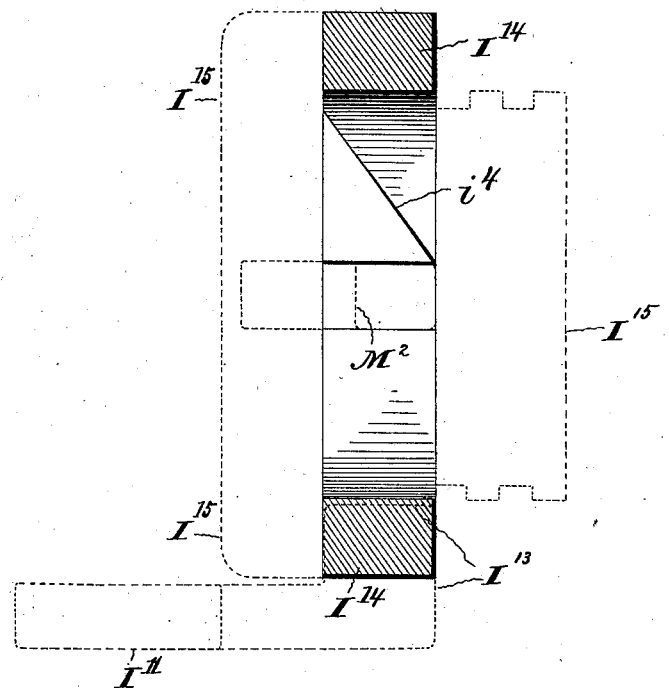
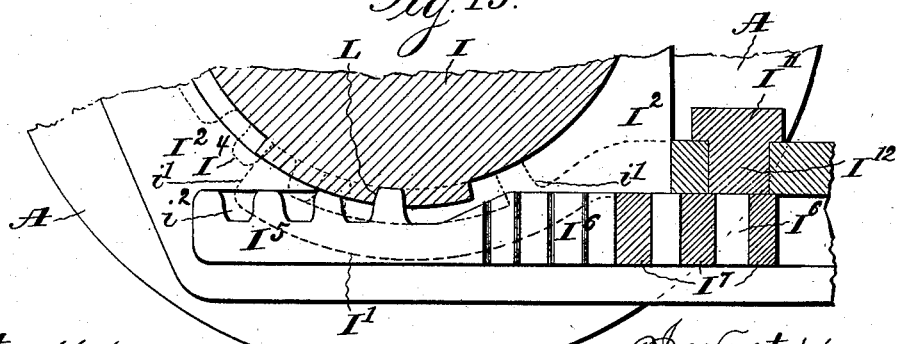

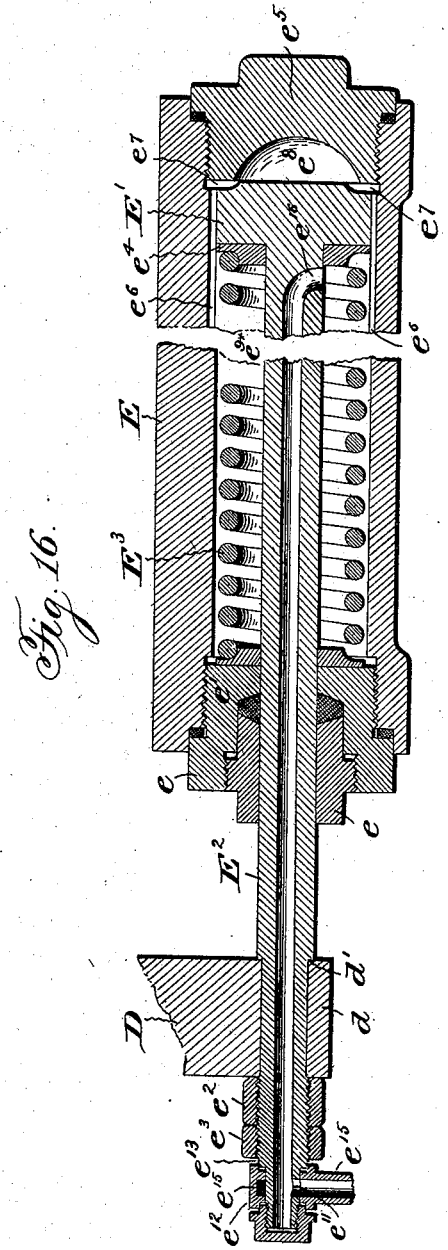

UNITED STATES PATENT OFFICE.

JOHN F. MEIGS AND SIGARD A. STEN HAMMAR, OF SOUTH BETHLEHEM, PENNSYLVANIA, ASSIGNORS, BY MESNE ASSIGNMENTS, TO BETHLEHEM STEEL COMPANY.

BREECH-LOADING GUN.

SPECIFICATION forming part of Letters Patent No. 700,217, dated May 20, 1902.

Application filed November 7, 1898. Serial No. 695,744. (No model.)

*To all whom it may concern:*

Be it known that we, JOHN F. MEIGS and SIGARD A. STEN HAMMAR, of South Bethlehem, in the county of Northampton, and in the State of Pennsylvania, have jointly invented certain new and useful Improvements in Breech-Loading Guns; and we do hereby declare that the following is a full, clear, and exact description thereof, reference being had to the accompanying drawings, in which—

Figure 7:
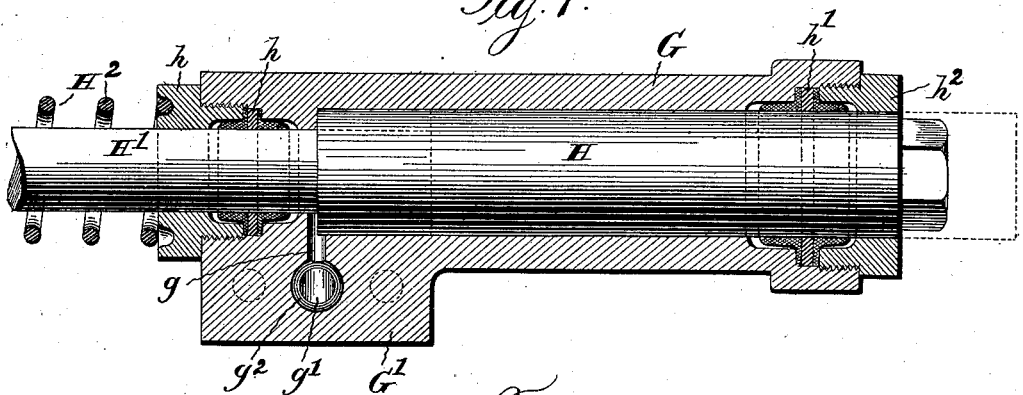
Figure 8:
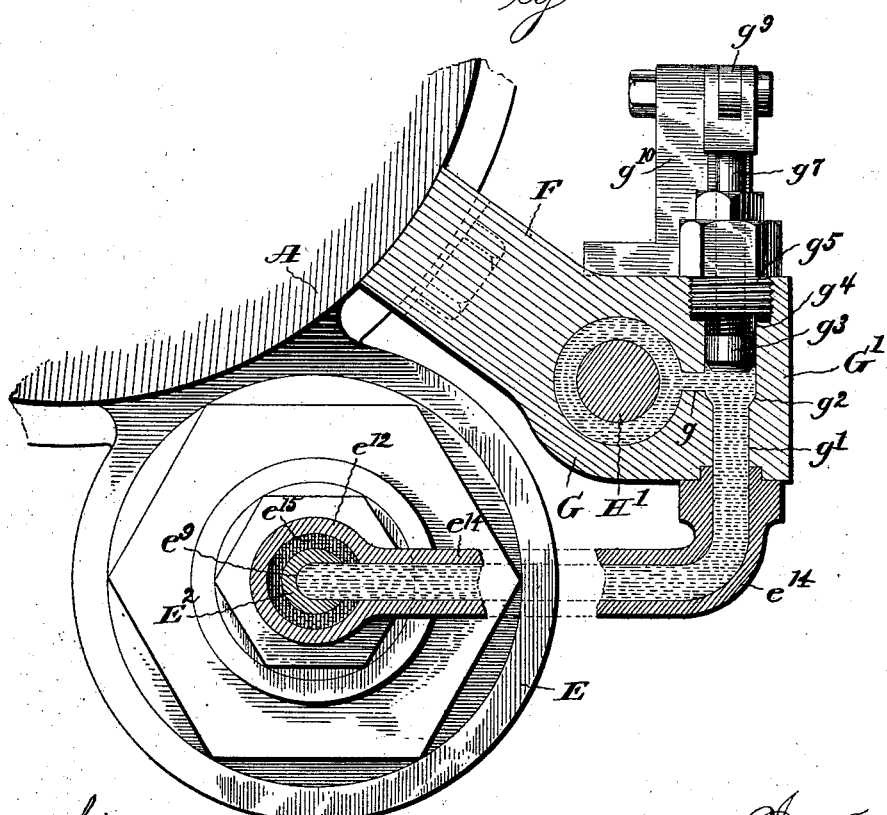
Figure 9:
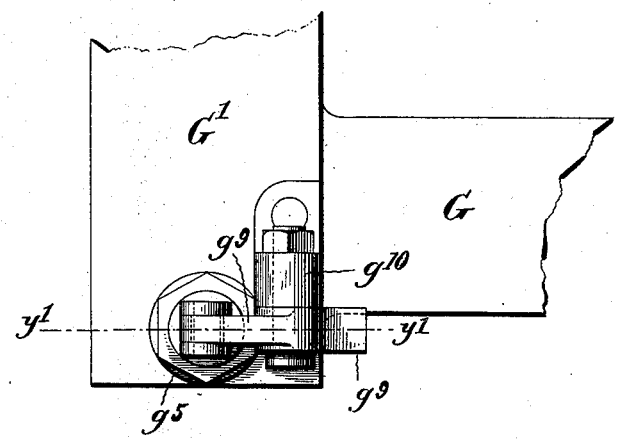
Figure 10:
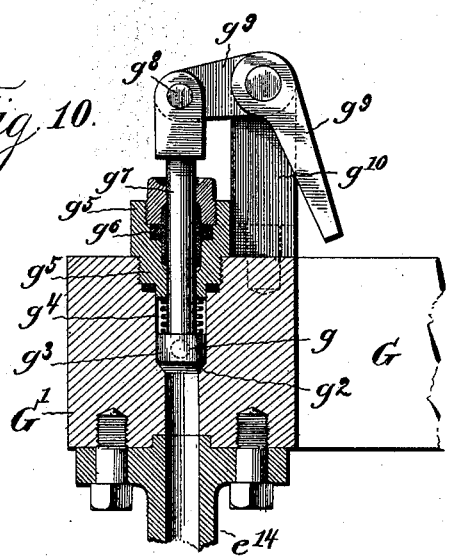

Figure 1 shows a view in side elevation of a gun provided with our invention; Fig. 2, a plan view of the same; Fig. 3, a view showing, on an enlarged scale, a rear elevation of the gun with the carriage, recoil-cylinders, and the connections between one of such cylinders and the rack-rod for actuating the breech mechanism removed; Fig. 4, a view of a section on line $xx$ of Fig. 3; Fig. 5, a view, on an enlarged scale, of a section on line $yy$ of Fig. 1; Fig. 6, a view of a section on line $zz$ of Fig. 1, the scale being larger than that of Fig. 1 and smaller than that of Fig. 5; Fig. 7, a view, on an enlarged scale, of a longitudinal section of the operating-cylinder; Fig. 8, a view, on an enlarged scale, of a section on line $x'x'$ of Fig. 1, the parts being shown in position, as when the piston of the operating-cylinder is being thrown forward; Fig. 9, a detail plan view of the valve mechanism on an enlarged scale; Fig. 10, a detail sectional view of the valve mechanism on line $y'y'$ of Fig. 9; Fig. 11, a sectional view, on an enlarged scale, showing a longitudinal section of the recoil-cylinder with the hollow piston and piston-rod; Fig. 12, a view of a section on line $z'z'$ of Fig. 11; Fig. 13, a detail perspective view of the trigger and the outer end of the sear to be engaged thereby; Fig. 14, a detail view of a section on a vertical longitudinal plane, showing the cocking-ring and its firing-pin-retracting cam or incline; and Fig. 15, a similar view of a section on a transverse plane, showing a cross-section of the breech-plug and the rack-bar in position, as when the plug has been moved some distance to the rear of its breech-closing position. Fig. 16 is a view showing a longitudinal section of an alternative construction of recoil-cylinder with a solid piston and a hollow piston-rod.

Letters of like name and kind refer to like parts in each of the figures.

The object of our invention has been to provide an improved breech-loading gun in which the breech mechanism will be automatically opened and closed by power derived from the pressure of fluid taken from the recoil-cylinder. The means for closing the breech will be under control as to the time and speed of its operation, and the firing device can be caused to act automatically as the breech-closing plug is moved into closed position and locked or can be caused to operate at any time desired after the closing and locking of the breech-plug.

Our invention consists in the gun and in the parts thereof constructed, arranged, and combined as hereinafter specified.

A special purpose which we have had particularly in view in devising the gun mechanism hereinafter described, and shown in the drawings has been to provide a gun so arranged as to its breech mechanism and firing devices that there will be in combination with means for automatically closing the breech plug or block a hand-operated device on one side of the gun to cause release of the breech-closing mechanism and on the other side of the gun a device adapted to be operated by hand which will at the will of the operator cause the gun to be fired as the breech plug or block is closed and locked or after the closing and locking of the plug or block at any desired time.

In devising the mechanism just above referred to it has been our intention to make the gun capable of being operated by two men, one of whom is to keep the gun pointed and operate the device for causing the firing, while the other on the other side of the gun is to cause or control the closing movement of the breech mechanism through a device to be actuated by him, the arrangement being such that the gun can be fired by the successive or simultaneous performance of two operations by the two men.

While the mechanism of the gun, as shown in the drawings, and described hereinafter, is designed for automatic operation by power derived from pressure transmitted from the recoil-cylinder, it is also so arranged as to be capable of operation by hand to cause opening of the breech for the admission of a load to the chamber of the gun and cause the breech to be closed.

While our improved gun is shown in the drawings, and will be described hereinafter, as arranged to have the breech mechanism operated to open the breech by power derived from the pressure of fluid forced from a recoil-cylinder of the gun during the return of the latter to battery after recoil and while this arrangement is the one which we prefer, we desire it to be understood that our breech-opening devices are adapted to be actuated as well by pressure of fluid from the recoil-cylinder during recoil of the gun.

In the drawings, A designates the gun-body proper, which is shown as mounted in an ordinary and well-known form of "recoil-mount," B, having a sleeve or hollow frame B, within which the body A is mounted and guided, so as to be capable of having rectilinear rearward and forward movement therein without rotation on its axis. Such sleeve or frame is, as usual, provided with trunnions, one of which is shown at B', which are mounted in suitable trunnion-bearings on a frame C, pivotally supported on a carriage or stand C' and provided with the usual means for swinging the frame C in a horizontal plane. The sleeve or hollow frame B, carrying the gun-body, is also shown as provided with the usual means for rocking it on its trunnions to adjust the elevation of the gun.

The body or gun proper, A, has secured to it at a point to the rear of sleeve B the usual ring D, to be connected with the devices for taking up the recoil of the gun when the latter is fired. Such devices, as shown, consist of two cylinders E E, which are rigidly secured to the hollow frame or sleeve B, and each one of which contains a reciprocating piston-head E', connected with a piston-rod $E^2$, passing rearward through a plug $e$, closing the rear end of the cylinder, and a stuffing-box $e'$, which can be of any desired construction, adapted to allow easy reciprocation of the piston-rod through it, while effectually preventing the leakage of fluid from within the cylinder out around the rod. Near its rear end each of these piston-rods $E^2$ $E^2$ passes through an opening in an ear $d$ on ring D and has a shoulder $d'$ bearing against the forward side of the respective ear. Beyond the rear side of the ear through which it passes each rod $E^2$ is screw-threaded and has screwed upon it a nut $e^2$, engaging the rear face of the ear, and a jam or lock nut $e^3$ to lock nut $e^2$ from turning.

The arrangement of recoil-cylinders, pistons, piston-rods, ring D, and of the connections between the latter and the piston-rods, so far described, is one usual and well known in recoil-mounts for ordnance.

Each cylinder E contains the usual spring $E^3$ around the respective rod $E^2$ and engaging at its opposite ends bearings $e^4$ $e^4$, resting against the rear face of the piston-head E' and the forward face of the plug $e$, which closes the rear end of the cylinder, respectively. This spring, exerting its stress against rearward travel of the respective piston-head E', caused by the recoil of the gun from firing and being compressed by such recoil, serves, by forcing the piston-head and connected rod and ring D forward again after the recoil has ceased, to return the gun to battery. The forward end of each cylinder is closed by a screw-plug $e^5$, which has its inner or rear face made concave, as shown in Fig. 11.

As in the recoil-cylinders for guns as heretofore used, each cylinder E is filled with a body of fluid, which can be water, oil, or other fluid, but preferably consists of a mixture of glycerin and water, such body of fluid being, as in the recoil-cylinders heretofore in use, for the purpose of acting as a brake to slow down the movement of the gun in recoil. For this purpose such cylinders or the piston-heads therein have been provided with ports or by-passes through which the fluid in the cylinder can flow past the piston-heads at a certain predetermined rate as such heads are moved back and forth, the rate of travel allowed to the heads being dependent upon the combined area of the ports or by-passes in the respective cylinders or piston-heads, all as will be understood by those familiar with recoil-mounts for ordnance.

In the present case the cylinders E E are, as in the cylinder shown in Fig. 11, provided with four longitudinal grooves $e^6$ $e^6$, forming by-passes extending from the forward ends of the spaces within the cylinders and which in the ordinary way should have their rearward ends situated to the rear of the points to which the rear faces of the respective piston-heads are carried by recoil of the gun.

Each of the piston-heads E' has in its front face short radial grooves $e^7$ $e^7$, the same in number as the grooves $e^6$ $e^6$ in the surrounding cylinder and similarly situated, so that their outer ends coincide with the cylinder-grooves. These grooves $e^7$ $e^7$ are of sufficient length to form ports or passes connecting the grooves $e^6$ $e^6$ with the recess or cavity $e^8$ in the cylinder-closing plug $e^5$ when the piston-head E' is at the end of its forward travel in the cylinder and is resting against the plug $e^5$ in the position normally occupied by it when the gun is in position ready for firing.

Where, as in the gun mechanism shown in the accompanying drawings, two recoil-cylinders are used, we make the piston head and rod of one of the cylinders (preferably the one on the right side) hollow, in the manner shown fully in Fig. 11—that is, with a small passage or bore $e^9$ extending entirely through both head and rod—and connect the two cylinders by means of an opening back of the most rearward position of breech-face of piston.

In the case of guns using only one recoil-cylinder the piston head and rod of that cylinder are made in the manner just described.

The rearward end of the hollow piston-rod is closed by a screw-cap $e^{10}$, and just forward of the latter there is a side port $e^{11}$ through the wall of the rod communicating with the interior of a hollow sleeve-coupling $e^{12}$, surrounding the piston-rod between cap $e^{10}$ and the shoulder $e^{13}$ on the rod and having its interior connected with a pipe $e^{14}$, preferably, but not necessarily, made in one piece with the coupling. The passage or port $e^{15}$, within coupling $e^{12}$, is an annular one, as shown in Fig. 8, so as to always be in full communication with the port $e^{11}$, even if there should be any twisting or rotation of the piston-rod or coupling with reference to each other.

Supported on a strong arm F, bolted to the body or gun proper, A, is a cylinder G, which we term the "operating-cylinder" and which is preferably formed in one piece with the head G', carrying the supporting-arm F. The interior of this cylinder at its rear end is connected with a port $g$, which in turn communicates with the passage $g'$ in head G', communicating with pipe $e^{14}$. At the point where passage $g'$ joins port $g$ a valve-seat $g^2$ is provided to receive a piston-valve $g^3$, adapted to close communication between said port and passage, the head of such valve being adapted when down or seated in closed position to entirely close the outer end of port $g$ against the outward flow of fluid from the operating-cylinder G. The upper end of the cylindrical recess $g^4$, provided in head G' for the putting in place and movement of valve $g^3$, is closed by a screw-plug $g^5$, provided with a stuffing-box $g^6$, through which and the plug $g^5$ passes the valve-stem $g^7$ for operating the valve, such stem having its upper end connected by pin $g^8$ with one arm of lever $g^9$, pivoted upon an arm $g^{10}$, bolted to the head G', the other arm of the lever being in such position as to be conveniently reached and operated to move the valve-head by any one standing on the right side of the gun. Fitted and sliding within the operating-cylinder G is a solid piston H, having connected with it the piston-rod H', extending out through the rear end of the cylinder and through the stuffing-box $h$ on such end. The forward end of piston H fits and slides through the stuffing-box $h'$ and has the packing-compressing device in the form of an annular screw plug or cap $h^2$, screwed into the cylinder end, but can be of any other desired construction.

With the connected recoil and operating cylinders a sufficient quantity of the water, oil, water and glycerin, or other fluid is used to fill the recoil-cylinder, the hollow piston-head E' and piston-rod E² and the connecting ports, pipe, and passages connecting the bore of the piston-rod with the rear end of the operating-cylinder G. The rear end of the piston-rod H' has screwed upon it a head $h^3$, between which and the rear end of the cap or plug $h^4$ of the stuffing-box $h$ is a spiral spring H², surrounding the rod H' and exerting its pressure on head $h^3$ to force the rod, and consequently the piston H, rearward toward and into the position which it is shown as occupying in Figs. 6 and 7. This rod H', with its head $h^3$, we connect with the breech mechanism which is to be operated in the manner to be described hereinafter.

While for convenience sake we have shown in the drawings and shall describe hereinafter our invention as applied to a certain form of breech mechanism, we desire it to be understood that we do not limit ourselves to the use of our invention in connection with such form of breech mechanism, but contemplate employing our operating devices and firing mechanism in connection with any other desired form of breech mechanism or devices for opening and closing breech-loading guns. The breech mechanism which we have shown in the drawings connected with the piston and head, so as to be operated by the movement of the rod forward and rearward under the action of forward pressure on the piston H in cylinder G and the rearward pressure of spring H² upon head $h^3$, is of the form known as the "Dashiell," being as to its breech-closing plug and the means for closing and locking and unlocking and opening the breech substantially the same in form as the mechanism for that purpose shown and described in United States Patent No. 468,331. Such mechanism need not, therefore, be described at length herein; but it is sufficient to refer to said patent for a full detailed description of it. Broadly, it has a breech-plug I of the interrupted screw-form, the breech being formed with corresponding interrupted screw-threads arranged to allow the direct inward and outward movement of the plug to insert it in and withdraw it from the breech and to secure locking and unlocking of the inserted plug when the latter is partially rotated in the way well known to those familiar with breech-closing devices for ordnance. It also has a tray I', with a collar I² on its front edge, which at one side has pivotal lugs or ears $i\,i$, engaging a vertical pin I³, supported on the breech of the gun at one side of the rear end thereof. The tray is, as in the gun shown and described in the patent hereinbefore referred to, provided with the two ribs $i'\,i'$ to engage longitudinal guiding-grooves on the breech-plug when the latter is being moved in and out on the tray, the grooves in the plug being so situated as to be brought in line with the respective ribs on the tray when the plug has been rotated to disengage its locking partial threads from the corresponding threads within the plug-receiving chamber of the breech of the gun. With the plug in this position it can be moved longitudinally rearward and forward to remove it from and insert it into the breech-plug chamber of the gun.

The periphery of the rear end of the breech-plug I is provided with a segmental series of gear teeth or cogs $I^4$ $I^4$, which are formed on a ring secured to the rear portion of the plug and which when the plug is seated in its chamber in the gun, so as to close the breech, are in position to be engaged by the teeth of the sliding toothed rack-bar $I^5$, guided in a transverse channel $i^2$ in the front of the tray $I'$. These teeth or cogs on the rack-bar, which is adapted to reciprocate in a direct line across beneath the breech-plug, are on the upper side of the bar. The latter has another series of teeth or cogs $I^6$ on its rear side engaged by the toothed segment $I^7$ on the breech mechanism operating lever $I^8$, pivotally supported on tray $I'$ by the pivot-pin $I^9$ passing down through the curved slot $I^{10}$. The travel of the rack-bar $I^5$ across the breech of the gun is limited by the end of guideway $i^2$, instead of by a stop lug or pin, as in the gun shown and described in the patent hereinbefore referred to. The pin $I^9$ also passes through a hole in the angle of the elbow-lever $I^{11}$, having the short arm pivotally connected with the tray $I'$ by the pin $I^{12}$, and the long arm provided with a stud $I^{13}$ engaging an opening $i^3$ in the cocking-ring $I^{14}$, journaled on a plug $I^{15}$, screwed into the rear end of the breech-plug and held on plug $I^{15}$ by an enlargement or head $I^{16}$ on the latter.

The operation of the parts of the breech mechanism and operative devices as so far described, which will be clearly understood from the description contained in the patent referred to, is briefly as follows: With the breech-plug in breech-closing position and turned to cause its interrupted threads to engage the corresponding threads within the breech-plug chamber and with the parts in position as shown in Figs. 1, 2, 3, and 4, if the lever $I^8$ be swung rearward and to the right it will first swing on pin $I^9$, so that the toothed segment $I^7$ will cause the rack-bar $I^5$ to travel to the left, and, through the meshing of the teeth on its upper side with the cogs or teeth $I^4$ $I^4$ on the breech-plug, to turn the latter far enough to disengage its interrupted threads from those on the plug-chamber in the breech, the partial turning of the plug thus caused bringing the longitudinal grooves in the plug into line with the plug-guiding ribs $i'$ $i'$ on the tray. The rack-bar $I^5$, having moved far enough to the left to cause the above-described partial rotation of the breech-plug, comes in contact with the end of its guideway and is stopped thereby. Continued movement of the operating-lever $I^8$ then causes the latter to swing upon the last or outer tooth of the rack-bar as a fulcrum, because of the engagement of its toothed segment $I^7$ with such tooth, and the pin $I^9$, passing through the curved tray-slot $I^{10}$ and connecting the lever $I^8$ with the elbow-lever $I^{11}$, moves out along the slot $I^{10}$ without swinging the tray and causes elbow-lever $I^{11}$ to swing rearward upon its pivotal pin $I^{12}$. This movement of lever $I^{11}$ through its described connection with the breech-plug causes the latter to be drawn longitudinally rearward upon the tray $I'$. When being thus retracted and drawn outward upon the tray, the plug finally comes in contact with the nose K of the tray-holding catch $K'$, pivoted in ears on the under side of the tray and normally engaging a lug or shoulder on the breech, as fully described in the patent referred to, and, tripping such catch, leaves the tray free to be swung rearward as the plug reaches the end of its rearward travel on the tray. When the levers $I^8$ and $I^{11}$ have been swung far enough to thus withdraw the breech-plug from the breech upon the tray, the pin $I^9$ comes in contact with the end of the slot $I^{10}$ in the tray and checking the swing of lever $I^{11}$ with reference to the tray, and consequently preventing further movement of the breech-plug with reference to the tray causes the latter to swing rearward and to the right upon its pivot, so as to carry the plug to one side and leave the breech open and clear for the withdrawal of a cartridge or the insertion of a new charge. The lever $I^8$ can be swung over to the right to cause and complete the swinging of the tray after the withdrawal of the breech-plug from the breech, or when it has been moved quickly far enough to withdraw the breech-plug from the breech upon the tray the momentum of the plug will, through the connection of the plug with elbow-lever $I^{11}$ and because of the engagement of pin $I^9$ with the end of the tray-slot $I^{10}$, be enough to cause and complete the swing of the tray without power further applied to lever $I^8$. To close the breech again, the lever $I^8$ is swung in the opposite direction or to the left, its first movement in that direction causing, by the engagement of pin $I^9$ with the side of slot $I^{10}$, the tray to swing forward to its normal position to bring the breech-plug in line with the breech-chamber. The movement of pin $I^9$ with lever $I^8$ causes the elbow-lever $I^{11}$ to slide the plug forward on the tray into its breech-closing position after the tray has been swung into its normal forward position, so as to bring the curved slot $I^{10}$ into concentricity with the swing of the elbow-lever $I^{11}$ upon its pivot-pin $I^{12}$. The pin $I^9$, then being in contact with the inner end of the tray-slot $I^{10}$, acts as a fulcrum for the further swinging of the lever $I^8$ with reference to the tray, which will cause its toothed segment $I^7$ to slide the rack-bar $I^5$ to the right again to cause the breech-plug to be rotated to bring its interrupted screw-threads into engagement with the corresponding threads within the breech to insure secure locking of the plug in the well-known way. To prevent the rack-bar $I^5$ from being moved to the right before the breech-plug has been inserted in the breech and to secure proper meshing of the teeth on top of the rack-bar with those on the breech-plug when the latter is in position for turning it to lock it in closed position, the breech-plug is provided with a longitudinal groove L, such as is shown and described in the patent hereinbefore referred to, to engage the last tooth at the right end of the series of teeth on the rack-bar top as long as the plug is to the rear of the position where it is to be turned on its axis to lock or unlock it in the breech. The lever $I^8$ will then when it is swung inward and forward to close the breech first fulcrum on the outer tooth of the series of teeth on the side of the rack-bar $I^4$. The firing-pin M, moving in a central passage $m$ in the breech-plug I, has on its rear end an arm $M^2$, moving in a recess $m'$ in the supplemental plug $I^{15}$, and is pressed toward its firing position by the firing-spring $M^3$, seated in a recess $m^2$ in the pin and bearing at its rear end against the rear end of recess $m'$ in plug $I^{15}$. The outer end of arm $M^2$ has a cocking-notch $m^3$ and to the rear of such notch has its edge beveled or rounded off, (see Fig. 4,) so as to be adapted to ride outward under and cam back the nose $m^4$ of the spring-pressed sliding sear $M^4$ on the gear-tooth bearing-ring secured to the breech-plug I when the firing-pin arm $M^2$ is forced back to retract and cock the firing-pin. To thus retract the arm $M^2$ and pin M when the breech-plug is rotated to unlock it ready for retraction to open the breech, the cocking-ring $I^{14}$, which is held from rotating with the breech-plug by the engagement of the stud $I^{13}$ on lever $I^{11}$ with the opening $i^3$ in the ring, is provided with an inclined cam-face $i^4$, adapted to engage and cam the arm $M^2$ rearward with reference to the breech-plug, as the latter is rotated with reference to the cocking-ring in a direction to disengage the screw-threads on the plug from those in the breech. The cam $i^4$ is of sufficient height to retract the arm $M^2$ far enough to bring the cocking-notch $m^3$ to the nose of the sear $M^4$, which is then forced into the notch by the movement of the sear under stress of the spring $m^5$, situated in a recess $m^6$ on the inner side of the sear and engaging the forward end of such recess and an abutment $m^7$ on the tray-ring $I^2$. This sear sliding radially with reference to the ring secured on the breech-plug can be supported in any desired way, but is preferably guided and supported on such ring by a groove with undercut sides engaging guide-ribs on the sear $M^4$.

With the construction of firing-pin with its retracting devices and the sear as just above described the firing-pin will be retracted into its cocked position, where it will be held by the sear, each time that the breech-plug is rotated to unlock it ready for withdrawal from the breech, and the cam-face on the cocking-ring will, by standing in the way of the forward side of the arm $M^2$ of the firing-pin, effectually prevent any such forward movement of the pin as would project its forward end from the breech-plug to fire the gun before the breech-plug has been returned to the breech and turned far enough to bring its interrupted screw-threads into such engagement with the corresponding threads on the breech as to effectually lock the plug against rearward longitudinal movement if the gun should be fired. The cocking-ring as arranged affords, then, not only a means for cocking the pin, but a safety device against premature firing before locking of the plug. The outer end of the sear $M^4$ has a trigger-engaging toe $m^8$ on its forward side adapted to project over the nose $m^9$ of the trigger $M^5$ when the breech-plug has been inserted and locked in position to close the breech. This trigger is pivoted in a radial recess $m^{10}$ in the breech of the gun and has besides the arm carrying the nose $m^9$ another outwardly-extending arm engaged by a spring-pressed plunger $m^{11}$, seated and guided in a recess $m^{12}$ in the breech and actuated by a spring $m^{13}$, seated partially in a cavity $m^{14}$ in the plunger and with its forward end engaging the front end of recess $m^{12}$. The action of the spring-pressed plunger on trigger $M^5$ serves to keep it normally held in the position shown in Fig. 4—that is, with its nose $m^9$ situated on the inner side of the path of the toe $m^8$ on the sear $M^4$—as the latter is moved toward the position in which it is shown in Figs. 3 and 4 by the locking rotation of the breech-plug, hereinbefore described. The nose of the trigger will then not tend to trip the sear while the trigger remains unswung and in its normal position, but will do so if the trigger is swung to carry the nose $m^9$ outward.

In order to provide for automatic firing of the gun by tripping of the sear $M^4$ as the breech-plug I has after being inserted in place in the breech been rotated to lock it, we have made the sear-toe $m^8$ and the trigger-nose $m^9$ beveled, as shown in Figs. 3, 4, and 13, the toe $m^8$ having its inner side beveled outward and forward with reference to the travel of the sear with the breech-plug during the locking rotation of the latter and the nose $m^9$ of the trigger having its outer side correspondingly beveled, so that if the trigger be pulled to swing its nose-carrying arm outward into the position shown in dotted lines in Fig. 4 the inclined or beveled face on it will be in position to engage the inclined face on the sear $M^4$ and cam the latter outward to disengage the sear-nose $m^4$ from the notch $m^3$ on the firing-pin arm $M^2$ to release such pin just as the locking rotation of the breech-plug is completed. The turning of the plug by the mechanism hereinbefore described to lock it in breech-closing position serves, then, in our gun to automatically cause firing of the gun when the trigger is held pulled into the position shown in dotted lines in Fig. 4.

To afford improved means for pulling the trigger as desired, we connect the end of a cord or lanyard N with the outer end of the trigger and lead such lanyard forward through a ring or loop $N'$ on the ring D, which is fixed on the gun-body A, and then rearward through an opening in the plate $N^2$, attached to and extending rearward from the annular frame or sleeve B, in which the gun-body slides. From the opening in the plate $N^2$ the lanyard passes forward again into position to be grasped and pulled by the man standing on the left side of the gun, who can then keep the gun pointed and control the firing.

With the arrangement of lanyard and guiding devices just above described it will be seen that we avoid any possibility of the lanyard being jerked from the hands of the operator by recoil of the gun, for as the gun-body and ring D travel rearward during recoil of the gun and the plate $N^2$ remains stationary slack will be produced in the portion of the lanyard between the guide ring or loop $N'$ and the guiding-opening in the plate $N^2$, and there will consequently be no pulling inward or rearward of the part of the lanyard reaching from the plate $N^2$ to the hand of the firer holding the lanyard end.

It will be understood that when the gun is not to be fired automatically, but at will, the lanyard is left slack during the closing and locking movement of the breech mechanism, so that the trigger is held in its normal position, with its nose $m^9$ out of the path of and disengaged from the sear-toe $m^8$, but in position to engage such toe whenever the trigger is subsequently pulled by the lanyard.

In order to operate the shown and described mechanism by power derived from fluid under pressure taken from the recoil-cylinder of the gun, in which cylinder the fluid is put under pressure by the movement of the piston-head which moves with the gun-body or gun proper in its recoil and return to battery, we have connected with or made in one piece with head $h^3$, screwed on the piston-rod $H'$ of the piston H in the operating-cylinder G, as hereinbefore described, a rack-bar $H^3$, guided and moving on the bracket-piece $H^4$, bolted to the gun-body A and having a central opening for the reception of the lower end of the hinge-pin $I^3$ of the tray I. Upon this pin we journal a segment-gear $H^5$ and a lever $H^6$, preferably made in one piece with the segmental gear, but which, if desired, may be made separate from the gear and attached thereto in any desired way, so that it will rotate with it on pin $I^3$. This lever $H^6$ has a stud $H^7$ engaging a groove $H^8$ in a projecting portion $H^9$ on the under side of lever $I^8$. The engagement of stud $H^7$ and the groove $H^8$ is such that as the lever $H^6$ swings from left to right, as it will do when the rack-bar $H^3$ is drawn forward by a forward travel of the piston H and piston-rod $H'$ and by engagement of its teeth with segment-gear $H^5$, causes said gear to rotate upon pin $I^3$, the lever $I^8$ will be swung in the same direction—that is, to right—so as to cause the breech mechanism to be actuated, as hereinbefore described, to unlock and retract the breech-plug, cock the firing-pin, and swing the tray, with the plug thereon, around to the right, so as to leave the passage to the breech of the gun clear for the insertion of another charge. The return swing of lever $H^6$ as the piston H, piston-rod $H'$, and rack-bar $H^3$ are reciprocated in the other direction, as they will be by the action of the spring $H^2$, compressed by the prior forward movement of the piston and rod, will then, because of the engagement of the stud $H^7$ with groove $H^8$, cause the lever $I^8$ to be returned to its normal position again, causing, as it swings in the manner and by the means hereinbefore described, the tray to be swung around to bring the breech-plug in line with the breech-chamber and the plug to be slid into such chamber and then rotated to cause it to be locked shut by the engagement of its interrupted screw-threads with the threads within the breech-plug chamber of the gun.

With the mechanism of our gun constructed and arranged as shown in the drawings and described hereinbefore the operation is, briefly, as follows: Starting with the breech mechanism closed and the piston H at the limit of its rearward travel in the operating-cylinder G and the piston $E'$ in the forward end of the recoil-cylinder E, when the gun is to be loaded valve $g^3$ is opened by pressing down the outer arm of the valve-operating lever $g^9$ and the lever $I^8$ is swung by hand to open the breech mechanism in the ordinary way, such opening, because of the preliminary unlocking rotation of the breech-plug, causing the firing-pin to be retracted into position to be held cocked by sear $M^4$. As the opening of the breech mechanism by lever $I^8$ causes, through the swinging of the connected lever $H^6$ and segment-gear $H^5$, the rack-bar $H^3$, piston-rod $H'$, and piston H to be reciprocated to compress spring $H^2$, the latter will exert its pressure to return the piston, piston-rod, and rack-bar to their normal positions, so as to cause a partial back rotation of the segment-gear and a swing of lever $H^6$ to cause its stud $H^7$, engaging groove $H^8$ on lever $I^8$, to swing the latter forward again to cause closing and locking of the breech mechanism in the manner explained hereinbefore. As the piston H is forced rearward in cylinder G, the valve $g^3$ being held open, it will draw fluid from the recoil-cylinder into the operating-cylinder through the described ports, passages, and pipe connecting the two cylinders E and G. If the operating-cylinder should be high enough with relation to the recoil-cylinder so that the liquid in the recoil-cylinder will not flow by gravity into the operating-cylinder, the liquid can be made to follow the operating-piston by permitting the presence of a sufficient quantity of air in the recoil-cylinder to force the liquid to fill the operating-cylinder. If when the breech mechanism has been thrown open as described the valve-operating lever be released, the valve-spring $g^4$ will throw the valve shut, so as to close the port $g$, opening into the operating-cylinder, and the operating-piston will be held from moving rearward by the fluid confined in the cylinder G. If, now, a load has been put in the gun-chamber, the closing of the breech mechanism can be caused upon the movement of the valve-lever to open the valve and establish communication between the port $g$ and passage $g'$, so that the fluid in cylinder G can flow out of the same back toward the recoil-cylinder E, leaving the piston H free to move rearward under stress of spring $H^2$, which then acts through head $h^3$, rack-bar $H^3$, segment-gear $H^5$, and lever $H^6$, with its stud and groove connection between it and lever $I^8$, to swing the latter lever, so that it will cause the breech-closing devices to be closed and locked in the manner already described. If the lanyard N is pulled to pull the trigger and trip the firing-pin-holding sear, the firing-pin actuated by spring $M^3$ will fire the charge in the gun. Recoil of the body A or gun proper will then, because of the connections between its ring D and the piston-rod $E^2$ of the recoil-cylinder E, draw the piston-head E' rearward in such cylinder against the stress of the recoil-spring $E^3$, the movement of the piston-head, and consequently of the gun in recoil, being slowed down by the retarding fluid in the cylinder, which must pass from the rear to the front of the piston through the ports or by-passes in the cylinder as the piston moves rearward in the cylinder, the rate of such passage of fluid, and consequently the rate of travel of the piston and the gun in recoil, being dependent upon the aggregate area of the ports or by-passes $e^6$ in cross-section. The gun-body and the piston E' having completed their rearward travel under the force of the recoil of firing and the spring $E^3$ being compressed by such travel of the piston, the stress of such spring acting upon the piston moves it forward again, so as to cause the piston-rod through its connections with ring D to return the gun to battery. This return of the piston under stress of spring $E^3$ causes the fluid which has accumulated in the cylinder E and is in bore of the piston-rod $E^2$, the ports, passages, and pipe, forming a communication between such piston-rod, bore, and the port $g$, entering the operating-cylinder G, to be put under great pressure, so that it will be forced from the recoil-cylinder out through the hollow piston-rod, and through the various communicating ports, passages, and pipe $e^{14}$, past valve $g^3$, which it raises, and into the rear end of the operating-cylinder G. There pressing upon piston H it forces the latter forward, so that through the rod H', head $h^3$, and rack-bar $H^3$ it causes the segment-gear $H^5$ to be rotated to swing lever $H^6$ so that through its stud-and-groove connection with lever $I^8$ such lever $H^6$ causes lever $I^8$ to swing around to the right to cause the breech mechanism to be unlocked and swing open in the manner already described, the firing-pin being retracted and cocked, as already explained, by the unlocking movement of the breech-plug. As soon as the piston E' in the recoil-cylinder has completed its forward travel within the latter and the pressure of the fluid in front of the piston begins to decrease the valve $g^3$ is at once closed by its spring $g^4$, so that none of the fluid can flow back again out of the operating-cylinder. The piston H is then held from return or rearward movement by the fluid confined behind it in the cylinder G until the valve $g^3$ is opened by movement of its operating-lever $g^9$. The described forward movement of the piston H, caused by the pressure of fluid from the recoil-cylinder, compresses the spring $H^2$ between head $h^3$ and the end of the stuffing-box plug or cap $h^4$, so that power will be stored up in it, enough to return the piston-rod and cylinder and cause lever $H^3$ to swing lever $I^8$ to the left again to close and lock the breech mechanism when the valve-lever is moved to open valve $g^3$, so as to leave the fluid in the operating-cylinder free to flow back toward the recoil-cylinder again. As long as the valve remains closed the lever $H^6$ cannot move to swing the lever $I^8$ forward or to the left and the breech mechanism is held open. When a new charge has been inserted in the gun-chamber and the breech is to be closed, the one who is to control the movements of the breech mechanism and stands at the right of the gun presses down on the outer arm of lever $g^9$, so as to cause the valve $g^3$ to be opened. The piston H and rod H' are then thrown quickly rearward by the compressed spring $H^2$, the flow of the liquid from the operating-chamber as the piston moves rearward being assisted by the partial vacuum existing in the recoil-cylinder, because of some of its liquid having been forced out from such cylinder during the forward movement of piston E' and kept from returning by the closing of valve $g^3$. The rearward movement of rod H' under stress of spring $H^2$, causing the rack-bar $H^3$ to turn the segment-gear $H^5$ and the lever $H^6$ to be swung to the left, causes lever $I^8$ to be swung to cause closing and locking of the breech mechanism. If the lanyard be pulled, so as to hold the trigger swung with its cam-faced nose in the path of the cam-faced toe on the sear $M^4$, as the breech-plug is turned to cause it to be locked, the trigger-nose will cause the sear to be tripped, to release the firing-pin and fire the gun, just as the locking movement of the breech-plug is completed. The gun-body or gun proper, A, will then by the firing be caused to recoil again to draw the piston E' in the recoil-cylinder rearward again to compress the recoil-spring $E^3$, as before, ready to have its stress applied again through the fluid in the recoil-cylinder, tubular piston-rod $E^2$, and the described ports, passages, and pipe between the recoil and operating cylinders to the piston H in the latter cylinder as the piston E' is forced forward again in the recoil-cylinder by such spring $E^3$ after the recoil of the gun has ceased. The stress of the recoil-spring being transmitted through the fluid in the manner described during the return of the gun to battery causes the breech mechanism to be unlocked and opened again and the firing-pin to be retracted or cocked in the manner already described, the valve $g^3$ acting again, as before, to check the backflow of the fluid from the operating-cylinder when the piston H has been forced forward to cause opening of the breech mechanism. The return movement of piston H and piston-rod H' under stress of spring H² to cause closing and locking of the breech mechanism is then prevented until the man whose duty it is to control the operation of the breech mechanism moves lever $g^9$ to open valve $g^3$, which he does after he sees that the man or men who have to insert the new load in the gun have withdrawn their arms and hands out of the way of the breech mechanism. By moving the lever $g^9$ to open valve $g^3$ more or less to regulate the flow of fluid past it he can regulate or control the speed of the operation of the breech-closing devices as desired. The one whose duty it is to fire the gun can then, as before, either pull the lanyard to cause the trigger to trip the sear and fire the gun automatically as the breech-plug is turned into its locking position after insertion to close the breech or can leave the lanyard loose, in which case the firing will not be automatic, as above described, but can be caused at any desired time by a pull on the lanyard to swing the trigger to trip the sear out of engagement with the cocking-notch on the head or arm M² of the firing-pin M.

While we have shown and described the operating-cylinder as so connected with the recoil-cylinder that fluid under pressure from the latter is taken through the hollow piston E² from in front of piston E', and the pressure on the fluid is that of the stress of the compressed recoil-spring E³, acting during the counter-recoil or return of the gun to battery, we contemplate, where desired, taking the fluid from the part of the recoil-cylinder to the rear of piston-head E' instead, so that the pressure on the fluid which is to move the piston H forward is that of the recoil of the gun, the breech being consequently unlocked and thrown open by the force of the recoil and during the recoiling movement of the gun.

We desire it to be understood also that while we have shown and described mechanism in which the fluid under pressure for operating the breech mechanism is taken from one recoil-cylinder we can without involving any departure from our invention take the fluid from several or all of the recoil-cylinders used with any gun. This can be easily arranged for by connecting the several cylinders by connections similar to those hereinbefore described with one or more ports $g$, opening into the operating-cylinder.

As indicated in the foregoing description, we do not limit ourselves to the use of any one kind of fluid in the recoil-cylinder or the passages and pipes connecting such cylinder with the operating-cylinder.

Our mechanism as shown and described would be operative to advantage even where the recoil-checking fluid in the recoil-cylinder is air instead of water, or oil and water, or other liquid.

An alternative construction is illustrated in Fig. 16, in which the breech is opened during the recoil of the gun instead of during the return of the gun to battery. This construction is precisely the same as that previously described except that the passage $e^{9*}$ instead of opening through the piston communicates by a lateral passage $e^{16}$ with the recoil-cylinder to the rear of the piston, the latter being left solid. In the operation of such construction the recoil of the gun carries the pistons E' to the rear, thus causing the fluid that is in the recoil-cylinder and to the rear of the piston to be put under pressure and driving it out through the passages $e^{16}$ and $e^{9*}$ to the operating-cylinder, where it causes the unlocking and opening of the breech mechanism during the recoil of the gun. The gun is thus in condition to be loaded while the counter-recoil is taking place.

As indicated hereinbefore, our operating devices as hereinbefore described are adapted for use in connection with many different forms of breech mechanism for breech-loading guns, all that is necessary in securing the proper application of our invention to the desired form of breech mechanism being that the piston of the operating-cylinder shall be connected with some moving or operating part of such breech mechanism.

Having thus described our invention, what we claim is—

1. In a breech-loading gun having a fluid-containing recoil-cylinder and a piston, in combination with breech mechanism, a cylinder and piston device mounted on the gun-body for operating such mechanism, and means whereby pressure from the recoil-cylinder is transmitted directly to the operating-cylinder, substantially as and for the purpose described.

2. In a breech-loading gun having a fluid-containing recoil-cylinder and a piston, in combination with a breech mechanism, a movable device for operating the latter including a piston, a cylinder for the piston mounted on the gun-body, and means whereby pressure from the recoil-cylinder is delivered directly to said other cylinder, substantially as and for the purpose set forth.

3. In a breech-loading gun having a fluid-containing recoil-cylinder and a piston, in combination with a breech-closing device, and means for moving it to cause it to be locked and unlocked, means mounted on the gun-body and actuated by pressure of fluid from the recoil-cylinder transmitted during counter-recoil, to cause the breech-closing device to be unlocked, substantially as and for the purpose shown.

4. In a breech-loading gun having a fluid-containing recoil-cylinder and a piston, in combination with a breech-closing device and means mounted on the gun-body for causing the breech device to be locked, and connections between the recoil-cylinder and the locking means, whereby power derived from the pressure of fluid taken from the recoil-cylinder during counter-recoil, causes locking of the breech, substantially as and for the purpose described.

5. In a breech-loading gun, in combination with the breech mechanism thereof, a recoil-cylinder containing fluid, the piston in such cylinder connected with the gun-body, the recoil-spring, a movable device mounted on the gun-body actuated by fluid from the cylinder, under pressure during the return of the piston after recoil, and operative connections between such device and a movable part of the breech mechanism whereby the latter is unlocked during counter-recoil, substantially as and for the purpose described.

6. In a breech-loading gun having a fluid-containing recoil-cylinder and a piston moving therein and connected with the gun-body, in combination with movable breech mechanism, a second cylinder mounted on the gun-body and in communication with the recoil-cylinder, a piston in the second cylinder, and connections between the latter piston and the breech mechanism, whereby the movements of said second piston unlock and open the breech mechanism, substantially as and for the purpose described.

7. In a breech-loading gun having a fluid-containing recoil-cylinder and a piston moving therein and connected with the gun-body, in combination with the movable breech mechanism of the gun, a second cylinder mounted on the gun-body and in communication with the recoil-cylinder, a piston in the second cylinder, moved in one direction by pressure of fluid under pressure from the recoil-cylinder, connections between the latter piston and the breech mechanism, and a spring acting to move the second piston in a direction opposite to that in which it is moved by the fluid under pressure from the recoil-cylinder, the movement of the second piston under pressure from the fluid causing the unlocking and opening of the breech mechanism and its movement by the spring closing and locking said mechanism, substantially as and for the purpose described.

8. In a breech-loading gun having a fluid-containing recoil-cylinder and a piston, in combination with the breech-plug, mechanism for unlocking and withdrawing the plug, that remains inoperative during recoil, a second cylinder and piston mounted on the gun-body, connections between the same and the said plug-operating mechanism, and means whereby fluid under pressure is transmitted from the recoil-cylinder to the other cylinder during counter-recoil, substantially as and for the purpose set forth.

9. In a breech-loading gun having a fluid-containing recoil-cylinder and a piston, in combination with the breech-plug, mechanism for unlocking and withdrawing the plug that has no movement relative to the gun-body during the recoil of the latter, a second cylinder and piston mounted on the gun-body, connections between the same and said plug-operating mechanism, a spring acting to move the recoil-piston forward, and connections between the two cylinders, whereby, during the action of said spring, fluid is transmitted from the recoil-cylinder to the other cylinder, substantially as and for the purpose shown.

10. In a breech-loading gun having a fluid-containing recoil-cylinder and a piston, in combination with the breech-plug, mechanism for unlocking and withdrawing the plug that has no movement relative to the gun-body during the recoil of the latter, a second cylinder and piston mounted on the gun-body, connections between the same and said plug-operating mechanism, means whereby fluid under pressure is transmitted from the recoil-cylinder to the other cylinder during counter-recoil, and a valve for controlling the exit of fluid from said second cylinder, substantially as and for the purpose set forth.

11. In a breech-loading gun, the combination of a recoil-cylinder and piston, one of which is connected to the gun-mount and the other of which is attached to the gun, an operating-cylinder and its piston for the breech mechanism one of which is attached to the gun and the other of which is attached to the breech mechanism, and means for conveying fluid which connects the recoil-cylinder with the operating-cylinder, substantially as and for the purpose described.

12. In a breech-loading gun, the combination of a recoil-cylinder that is carried by the gun-mount, a piston for said recoil-cylinder which piston is attached to the gun, an operating-cylinder also attached to the gun and connected with said recoil-cylinder, and a piston in said operating-cylinder and connected to the breech mechanism, substantially as and for the purpose described.

13. In a gun, in combination with a fluid-containing recoil-cylinder, the piston moving therein, and connected with the gun-body so as to be moved by the recoil thereof, the recoil-spring, the hollow piston-rod having its bore connected with the interior of the cylinder by a suitable fluid-conducting passage or port, a second cylinder connected with the bore of the piston-rod by suitable fluid-conducting passages, a piston moving in the second cylinder, and adapted to be moved in one direction by the pressure of fluid in its cylinder, and spring mechanism acting to return the piston after such movement, substantially as and for the purpose described.

14. In a gun, in combination with a fluid-containing recoil-cylinder, the piston moving therein and connected with the gun-body, so as to be moved by the recoil thereof, the recoil-spring, the hollow piston-rod having its bore connected with the interior of the cylinder by a suitable fluid-conducting passage or port, a second cylinder connected with the bore of the piston-rod by suitable fluid-conducting passages, a piston moving in the second cylinder, and adapted to be moved in one direction by the pressure of fluid in its cylinder, spring mechanism acting to return the piston after such movement, a movable valve to check the flow of fluid from the second cylinder, and means for moving such valve, substantially as and for the purpose described.

15. In a gun, in combination with a fluid-containing recoil-cylinder and a hollow piston moving therein and connected with the gun-body so as to be moved by the recoil thereof, a recoil-spring compressed by the movement of the piston, during recoil of the gun, a hollow piston-rod having its bore connected with that in the piston, a second cylinder connected with the recoil-cylinder by suitable fluid-conducting connections, a piston moving in the second cylinder adapted to be moved in one direction by the pressure of fluid in its cylinder, and spring mechanism to return such piston after it has been moved by the fluid, substantially as and for the purpose described.

16. In a gun, in combination with the gun-body, a hollow piston and piston-rod, connections between such rod and the gun-body, a recoil-cylinder in which the piston moves, containing fluid and provided with suitable ports or by-passes to allow passage of the fluid by the piston, a recoil-spring compressed by the movement of the piston, during recoil of the gun, and acting to return the piston after the recoil is completed, a second cylinder connected with the bore of the piston-rod by fluid-conducting connections, and a movable head moved by the pressure of fluid in the second cylinder, substantially as and for the purpose described.

17. In a breech mechanism for guns, the combination of a breech-block that is adapted to be closed by a rotary motion, a sear radially mounted on said breech-block, and a cam in the path of the sear and adapted to move the sear as the breech is closed, substantially as described.

18. In a breech mechanism for guns, in combination with the breech-closing plug adapted to be locked in its breech-closing position by rotation, a spring-pressed firing-pin having a notched part, a spring-pressed firing-pin-holding sear, rotating with the plug, and having a trigger-engaging shoulder, a trigger around to which the sear-shoulder is brought by the locking rotation of the plug, and which has a nose to engage the sear-shoulder, either or both the sear-shoulder and the trigger-nose being beveled, so that, if the trigger is held pulled before the breech-plug is moved into locking position to carry its nose into the path of the sear-shoulder, the engagement of the trigger-nose and shoulder will cause the sear to be tripped to release the firing-pin, as the rotation of the plug, to cause its locking, is being completed, and a spring device to hold the trigger swung normally in position to keep its nose out of the path of the sear-shoulder, substantially as for the purpose described.

19. In combination with the means for releasing the firing device of a recoil-mounted gun, the firing-lanyard connected with such device, a suitable guide for the lanyard situated on a part moving with the gun-body, to which guide the lanyard runs forward from the firing-device-releasing means, and a second guide over which the lanyard runs situated on a part stationary with reference to the recoiling part of the gun, such second guide being situated to the rear of the first guide, so that the lanyard runs rearward to it from the latter guide, substantially as and for the purpose described.

20. In a breech-loading gun, in combination with the breech-plug adapted to be locked in breech-closing position by axial rotation, a spring-pressed firing-pin having a radial arm with a cocking-notch, a spring-pressed sear moving with the breech-plug, as the latter is rotated, and having a nose to engage the notch on the firing-pin arm and a trigger-engaging shoulder, a cocking-ring journaled upon a bearing moving with the plug and having a cam-face to retract the arm of the firing-pin, means for holding such ring from rotating with the plug, a trigger for tripping the sear after the plug has been rotated far enough to lock it from opening by the pressure brought upon it when the gun is fired, and a spring acting to hold the trigger normally swung to keep its sear-engaging nose out of the path of the sear-shoulder, substantially as and for the purpose described.

21. The combination of a gun mounted to recoil, a firing-lanyard, and a guide for said lanyard fixed with reference to the movement of the gun under recoil, and situated so that the lanyard runs forward from said guide to the gun when the latter is its firing position, whereby when the gun moves rearward under recoil, there is no pull on the lanyard in the hands of the gunner, substantially as and for the purpose described.

In testimony that we claim the foregoing we have hereunto set our hands this 28th day of October, 1898.

JOHN F. MEIGS.
SIGARD A. STEN HAMMAR.

Witnesses:
EDWARD J. MALLOY,
WALTER J. WAGNER.